United States Patent [19]

D'Sidocky et al.

[11] Patent Number: 6,079,468
[45] Date of Patent: *Jun. 27, 2000

[54] RUBBER ARTICLE CONTAINING A BISMALEIMIDE AND A BIS BENZOTHIAZOLYDITHIO END CAPPED COMPOUND

[75] Inventors: Richard Michael D'Sidocky, Ravenna; Neil Arthur Maly; Lawson Gibson Wideman, both of Tallmadge, all of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,050

[22] Filed: Aug. 9, 1996

[51] Int. Cl.$^7$ .............................. B60C 1/00; C08C 19/22
[52] U.S. Cl. ......................... 152/564; 525/332.7
[58] Field of Search ............. 36/32 R; 152/151, 152/450, 548, 564

[56] References Cited

U.S. PATENT DOCUMENTS

| | | |
|---|---|---|
| 3,639,300 | 2/1972 | Takahashi . |
| 3,846,371 | 11/1974 | Ro ............................................. 152/330 |
| 3,979,369 | 9/1976 | Trivette, Jr. . |
| 4,418,483 | 12/1983 | Fujita ........................................... 36/28 |
| 4,427,831 | 1/1984 | Komuro . |
| 4,433,114 | 2/1984 | Coran et al. .......................... 525/332.6 |
| 4,803,250 | 2/1989 | Nagasaki ................................. 525/347 |
| 4,904,725 | 2/1990 | Himes ......................................... 36/32 |
| 4,933,385 | 6/1990 | Yamamoto et al. ..................... 524/105 |
| 4,960,833 | 10/1990 | Nagasaki et al. ..................... 525/329.3 |
| 5,153,248 | 10/1992 | Muse ....................................... 525/347 |
| 5,328,963 | 7/1994 | Muse et al. ............................. 525/282 |
| 5,341,862 | 8/1994 | Hashimoto .............................. 152/209 |
| 5,503,940 | 4/1996 | Majumdar et al. ..................... 428/492 |

FOREIGN PATENT DOCUMENTS

| | | | |
|---|---|---|---|
| 0345825 | 12/1985 | European Pat. Off. | .......... C08K 5/34 |
| 0476310 | 8/1991 | European Pat. Off. | .......... C08K 5/20 |
| 0564966 | 10/1993 | European Pat. Off. | ........ C08L 21/00 |
| 9207904 | 5/1992 | WIPO | .......................... C08K 5/3415 |
| 9309178 | 5/1993 | WIPO | .............................. C08L 7/00 |
| 9322377 | 11/1993 | WIPO | .......................... C08K 5/3415 |
| 9429380 | 12/1994 | WIPO | .......................... C08K 5/3415 |

OTHER PUBLICATIONS

Abstract for JP 03056544.
Prashchikina, A.S., et al, Kauchuk i Rezina, No. 7, p. 14 (1979).
Chemical Abstract for JP 62 100 542 A (Kawaguchi Chem Ind).

*Primary Examiner*—Christopher Henderson
*Attorney, Agent, or Firm*—Bruce J Hendericks

[57] ABSTRACT

This invention relates to the discovery that the combination of a bismaleimide compound and a bis benzothiazolyldithio end capped compound provides for excellent vulcanization of rubbers and results in desirable reversion resistant rubbers properties.

12 Claims, No Drawings

RUBBER ARTICLE CONTAINING A BISMALEIMIDE AND A BIS BENZOTHIAZOLYDITHIO END CAPPED COMPOUND

BACKGROUND OF THE INVENTION

U.S. Pat. No. 3,979,369 relates to a method for crosslinking rubber with polysulfides. Included in the hundreds of polysulfides listed in this reference are bis benzothiazolyldithio end capped compounds.

Use of the described bis-benzothiazolyldithio end capped compounds does not yield the desirable anti-reversion properties and reduced heat rise that is sought related to the current invention.

PCT application number PCT/EP94/018 (WO 94/29380 discloses a rubber composition containing citraconimides and itaconimides as anti-reversion coagents.

SUMMARY OF THE INVENTION

The present invention relates to a rubber composition containing the combination of:
(a) a bismaleimide and
(b) a bis benzothiazolyldithio compound of the formula:

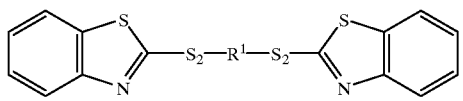

wherein R1 is selected from the group consisting of alkylene radicals having from 1 to 20 carbon atoms, cycloalkylene radicals having from 6 to 24 carbon atoms and arylene radicals having from 6 to 18 carbon atoms, alkarylene radicals having from 7 to 25 carbon atoms and divalent radicals of the formula:

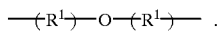

DETAILED DESCRIPTION OF THE INVENTION

There is disclosed a sulfur vulcanizable rubber composition comprising:
(a) a rubber selected from the group consisting of natural rubber, a rubber derived from a diene monomer and mixture thereof;
(b) from about 0.1 to about 10 phr of a bismaleimide compound of the general formula:

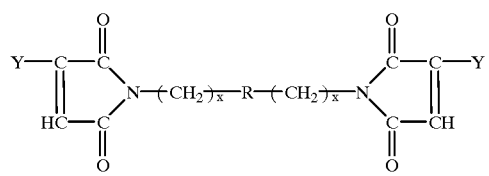

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms, wherein these divalent groups may contain a hetero atom selected from O, N and S; X is 0 or an integer of from 1 to 3 and Y is hydrogen or—$CH_3$; and (c) from about 0.1 phr to about 10 phr of a bis benzothiazolyldithio compound of the general formula:

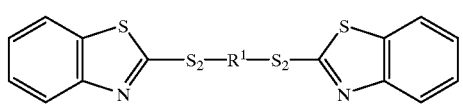

where $R^1$ is selected from the group consisting of alkylene radicals having from 1 to 20 carbon atoms, cycloalkylene radicals having from 6 to 24 carbon atoms and arylene radicals having from 6 to 18 carbon atoms, alkarylene radicals having from 7 to 25 carbon atoms and divalent radicals of the formula:

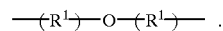

The bismaleimide is an essential component in the claimed invention. The bismaleimide is generally present in an amount of from about 0.1 to 10 phr. Preferably, the bismaleimide is present in an amount ranging from about 0.5 to about 5 phr.

Representative of the bismaleimides of formula I and which may be used in the present invention include N,N'-ethylenebismaleimide, N,N'-hexamethylenebis maleimide, N,N'-dodecamethylenebismaleimide, N,N'-(2,2,4-trimethylhexamethylene)bismaleimide, N,N'-(oxy-dipropylene)bismaleimide, N,N'-(aminodipropylene)-bismaleimide, N,N'-(ethylenedioxydipropylene)-bismaleimide, N,N'(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'- (oxy-1,4-dicyclohexylene)bismaleimide, N,N'-(m-phenylene) bismaleimide, N,N'-p-(phenylene) -bismaleimide, N,N'-(o-phenylene)bismaleimide, N,N'-(1,3-naphthylene) bismaleimide, N,N'-(1,4-naphthylene) -bismaleimide, N,N'-(1,5-naphthylene)bismaleimide, N,N -(3,3'-dimethyl-4,4'-diphenylene)bismaleimide, N,N'-(3,3-dichloro-4,4'-biphenylene)bismaleimide, N,N'-(2,4-pyridyl) bismaleimide, N,N'-(2,6-pyridyl) -bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-( 5-chloro-1,3-phenylene) -bismaleimide, N,N'-(5-hydroxy-1,3-phenylene)-bismaleimide, N,N'-(5-methoxy-1,3-phenylene)-bismaleimide, N,N'-(m-xylylene)bismaleimide, N,N'-(p-xylylene)bismaleimide, N,N'-(methylenedi-p-phenylene) bismaleimide, N,N'-(isopropylidenedi-p-phenylene) bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene) bismaleimide, N,N'-(carbonyldi-p-phenylene) bismaleimide, α,α-bis-(4-maleimidophenyl)-meta-diisopropylbenzene, α,α-bis-(4-p-phenylene) bismaleimide, N,N'-(m-xylylene)bis-citraconimide and α,α-bis-(4-maleimidophenyl)-para-diisopropylbenzene. The preferred bismaleimide is N,N'-(m-xylylene) biscitraconimide.

The other essential feature of the present invention is the presence of a bis benzothiazolyldithio compound of the formula:

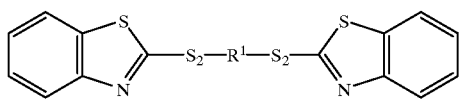

II wherein $R^1$ is selected from the group consisting of alkylene radicals having from 1 to 20 carbon atoms, cycloalkylene radicals having from 6 to 24 carbon atoms and arylene radicals having from 6 to 18 carbon atoms, alkarylene radicals having from 7 to 25 carbon atoms and divalent radicals of the formula:

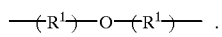

Preferably, $R^1$ is an alkylene radical having 6 carbon atoms.

The bis benzothiazolyldithio compound is generally present in an amount ranging from about 0.1 to 10 phr. Preferably, such compound is present in an amount ranging from about 0.5 to 5 phr.

Representative compounds of formula II include 1,1-bis(2-benzothiazolyldithio)methane; 1,2-bis(2-benzothiazolyldithio)ethane; 1,3-bis(2-benzothiazolyldithio)propane; 1,4-bis(2-benzothiazolyldithio)butane; 1,6-bis(2-benzothiazolyldithio)hexane; 1,8-bis(2-benzothiazolyldithio)octane; 1,10-bis(2-benzothiazolyldithio)decane; 1,10-bis(2-benzothiazolyldithio)octadecane; 1,18-bis(2-benzothiazolyldithio)octadecane; 2,2'-bis(2-benzothiazolyldithio)oxydiethane; 2,2'-bis(2-benzothiazolyldithio)thiodiethane; 4,4'-bis(2-benzothiazolyldithio)oxydibutane; 1,1-bis(2-benzothiazolyldithio)-1,4-cyclohexanedimethane; 1,4-bis(2-benzothiazolyldithio)benzene; α,α'-bis(2-benzothiazolyldithio)p-xylene; 1,2-bis(2-benzothiazolyldithio)cyclohexane; 1,1-bis(2-benzothiazolyldithio)cyclohexane; 1,4-bis(2-benzothiazolyldithio)cyclohexane; 1,4-bis(2-benzothiazolyldithio)naphthalene; 4,4'-bis(2-benzothiazolyldithio)biphenyl; 4,4'-bis(2-benzothiazolyldithio)oxybisbenzene and mixtures thereof.

Examples of rubbers for use in the present invention include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred rubbers which may be used with the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. The sulfur vulcanizing agent is generally present in an amount ranging from about 0.5 to about 6 phr. Preferably, the sulfur vulcanizing agent is present in an amount ranging from about 0.75 phr to about 4.0 phr.

Conventional rubber additives may be incorporated in the rubber stock of the present invention. The additives commonly used in rubber stocks include fillers, plasticizers, waxes, processing oils, retarders, antiozonants, antioxidants and the like.

The total amount of filler that may be used may range from about 30 to about 150 phr, with a range of from about 45 to about 100 phr being preferred. Fillers include clays, calcium carbonate, calcium silicate, titanium dioxide and carbon black. Representatives carbon blacks that are commonly used in rubber stocks include N110, N121, N220, N231, N234, N242, N293, N299, N330, N326, N330, N332, N339, N343, N347, N351, N358, N375, N472, N660, N754, N762, N765 and N990. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutylphthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid, murastic acid, and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

The terms "non-productive" and "productive" mix stages are well known to those having skill in the rubber mixing art.

Siliceous pigments may be used in the rubber compound applications of the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

In-situ resins may be formed in the rubber stock and involve the reaction of cashew nut oil modified novolak-type phenolic resin and a methylene donor. The term "methylene donor" is intended to mean a compound capable of reacting with the cashew nut oil modified novolak-type phenolic resin and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

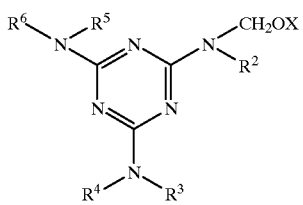

wherein X is an alkyl having from 1 to 8 carbon atoms, $R^2$ $R^3$, $R^4$, $R^5$ and R6 are individually selected from the group consisting of hydrogen, an alkyl having from 1 to 8 carbon atoms, the group—$CH_2OX$ or their condensation products. Specific methylene donors include hexakis-(methoxymethyl)melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl) melamine and N,N'N''-tributyl -N,N',N''-trimethylolmelamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, paraphenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The sulfur vulcanizable rubber compound is cured at a temperature ranging from about 125° C. to 180° C. Preferably, the temperature ranges from about 135° C. to 160° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The rubber composition of this invention can be used for various purposes. For example, the rubber compounds may be in the form of a tire, hose, belt or shoe sole. Preferably, the rubber compound is used for various tire compounds. Such pneumatic tires can be built, shaped, molded and cured by various methods which are known and will be readily apparent to those having skill in such art. Preferably, the rubber composition is used as a wire coat, bead coat, ply coat and tread. As can be appreciated, the tire may be a passenger tire, aircraft tire, truck tire, earthmover, agricultural and the like.

The present invention may be better understood by reference to the following examples in which the parts or percentages are by weight unless otherwise indicated.

EXAMPLE 1

The rubber stock was prepared in a two-stage non-productive and one-stage productive Banbury mix procedure. All ingredients are listed in Table I. All parts and percentages are by weight unless otherwise noted.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected.

Cure reversion measured using a rheometer can be defined as the incremental time required for a fixed decrease in torque from the maximum value, expressed here for example as $M_{HF}$–1 Point (time for the torque to decrease 1.0 unit or point below the maximum value $M_{HF}$ Torque). Such cure reversion measurements are defined by G. M. Bristow (NR Technology, 17 (1) 7, 1986).

The following Tables II and III report cure properties that were obtained for the rubber stocks that were prepared. These properties include a minutes to 25 percent of the torque increase (t25), minutes to 90 percent of the torque increase (t90). Table III reports the vulcanizate properties for the rubber stocks cured for 20 minutes at 150° C., 90 minutes at 150° C., 6 minutes at 170° C. and 28 minutes at 170° C.

Thus, examination of Table II shows the reversion-resistant behavior at 150° C. and 170° C. for Perkalink® 900 and BBDTH (Sample 2) used in combination, BBDTH used alone (Control Sample 3) and Perkalink® 900 used alone (Control Samples 4 and 5), versus Control Sample 1 which has no anti-reversion agents added to the compound formulation of Table I. When examining Table II, it is clear that Perkalink® 900 and BBDTH (Sample 2) used in combination provided excellent reversion-resistant behavior when compared to Control Sample 1 which had no anti-reversion agents added to the compound formulation of Table I and was, surprisingly, superior to BBDTH used alone (Control Sample 3) and Perkalink® 900 used alone (Control Samples 4 and 5). Thus, at the 150° C. cure temperature, Control Sample 1 had reverted –1 pt in 7 minutes, while Perkalink® 900 and BBDTH (Sample 2) used in combination reverted –1 pt in 97 minutes. BBDTH used alone (Control Sample 3) and Perkalink® 900 used alone (Control Samples 4 and 5) likewise had significantly more reversion versus Sample 2, –1 pt in 30 minutes, –1 pt in 10 minutes and –1 pt in 12.5, respectively, versus –1 pt in 97 minutes for Sample 2 of this invention. A synergistic improvement in reversion resistance is, surprisingly, noted with this combination. At the higher cure temperature of 170° C, Control Sample 1 had reverted –5 pts in 6 minutes, while Perkalink® 900 and BBDTH (Sample 2) used in combination had reverted –5 pts in 64 minutes showing a significant improvement in the rate of reversion. BBDTH used alone (Control Sample 3) and Perkalink® 900 used alone (Control Samples 4 and 5) had significantly greater reversion rates versus the Perkalink® 900/BBDTH combination (Sample 2) of this invention, –5 pts in 15 minutes, –5 pts in 8 minutes and –5 pts in 13 minutes, respectively, versus –5 pts in 64 minutes for Sample 2. Again, at the higher cure temperature of 170° C., a synergistic improvement in reversion resistance was surprisingly noted with this combination.

TABLE I

|  | Control Sample 1 | Sample 2 | Control Sample 3 | Control Sample 4 | Control Sample 5 |
|---|---|---|---|---|---|
| 1st Non-Productive |  |  |  |  |  |
| Natural Rubber | 100 | 100 | 100 | 100 | 100 |
| Processing Oil | 5 | 5 | 5 | 5 | 5 |
| Carbon Black (N299) | 30 | 30 | 30 | 30 | 30 |
| 2nd Non-Productive |  |  |  |  |  |
| Carbon Black (N299) | 10 | 10 | 10 | 10 | 10 |
| Stearic Acid | 2 | 2 | 2 | 2 | 2 |
| Zinc Oxide | 3 | 3 | 3 | 3 | 3 |

TABLE I-continued

|  | Control Sample 1 | Sample 2 | Control Sample 3 | Control Sample 4 | Control Sample 5 |
|---|---|---|---|---|---|
| Productive |  |  |  |  |  |
| PVI[1] | 0.1 | 0.1 | 0.1 | 0.1 | 0.1 |
| Antioxidant[2] | 0.75 | 0.75 | 0.75 | 0.75 | 0.75 |
| Sulfur | 2.25 | 2.25 | 2.25 | 2.25 | 2.25 |
| CBS[3] | 1 | 1 | 1 | 1 | 1 |
| Perkalink ® 900[4] | 0 | 1 | 0 | 1 | 2 |
| BBDTH[5] | 0 | 3.69 | 3.69 | 0 | 0 |

[1]N-cyclohexylthiophthalimide prevulcanization inhibitor
[2]Mixed aryl-p-phenylenediamines
[3]N-cyclohexyl benzothiazole-2-sulfenamide
[4]N,N'-(m-xylylene)bis-citraconimide
[5]BBDTH = 1,6-bis-(2-benzothiazolyldithio)hexane

TABLE II

|  | Control Sample 1 | Sample 2 | Control Sample 3 | Control Sample 4 | Control Sample 5 |
|---|---|---|---|---|---|
| Rheometer @ 150° C. |  |  |  |  |  |
| $M_{HF}$ Torque Units (dNm) | 40 | 45 | 47 | 38.5 | 37.5 |
| $M_L$ Torque Units (dNm) | 6 | 5 | 6 | 5.5 | 5.5 |
| $M_{HF}$–$M_L$ Torque Units (dNm) | 34 | 40 | 41 | 33 | 32 |
| Time to $M_{HF}$ Torque Units, min | 20 | 23 | 20 | 20 | 18.5 |
| Time to 1 PT Rise, min | 6 | 3.5 | 3.8 | 6 | 6 |
| Cure Time, t25, min | 8 | 5 | 5.2 | 8.2 | 8 |
| Cure Time, t90, min | 12.5 | 8 | 8.2 | 12.5 | 12 |
| Reversion (time to drop designated points below maximum torque $M_{HF}$) |  |  |  |  |  |
| $M_{HF}$-1 Point | 7 | 97 | 30 | 10 | 12.5 |
| $M_{HF}$-2 Points | 14 | none | 44 | 18 | 31.5 |
| Rheometer @ 170° C. |  |  |  |  |  |
| $M_{HF}$ Torque Units (dNm) | 39 | 45 | 46 | 37 | 36.5 |
| $M_L$ Torque Units (dNm) | 5 | 5 | 5 | 5 | 4.5 |
| $M_{HF}$–$M_L$ Torque Units (dNm) | 34 | 40 | 41 | 32 | 32 |
| Time to $M_{HF}$ Torque Units, (min) | 6 | 6 | 6 | 6 | 6 |
| t25, (min) | 3 | 2.5 | 2.5 | 3 | 3 |
| t90, (min) | 4.2 | 3.5 | 3 | 4.5 | 4.5 |
| $M_{HF}$-1 Point | 1.5 | 4 | 4 | 2 | 1.5 |
| $M_{HF}$-2 Points | 2.5 | 9 | 7 | 3 | 3 |
| $M_{HF}$-3 Points | 3.5 | 14 | 9 | 4 | 4.5 |
| $M_{HF}$-4 Points | 5 | 25 | 12 | 6 | 6.5 |
| $M_{HF}$-5 Points | 6 | 64 | 15 | 8 | 13 |

TABLE III

|  | Control Sample 1 | Sample 2 | Control Sample 3 | Control Sample 4 | Control Sample 5 |
|---|---|---|---|---|---|
| Modulus at 300% Elongation, MPa |  |  |  |  |  |
| 20'/150 C. cure | 13.6 | 15.84 | 17.02 | 12.67 | 11.92 |
| 90'/150 C. cure | 9.65 | 16.2 | 15.21 | 11.4 | 12.19 |
| percent change | −29 | +2.3 | −10.6 | −10.0 | +2.2 |
| 6'/170 C. cure | 12.04 | 14.51 | 15.56 | 11.05 | 10.43 |
| 28'/170 C. cure | 6.87 | 13.36 | 12.23 | 8.79 | 9.77 |
| percent change | −42.9 | −7.9 | −21.4 | −20.5 | −6.3 |
| Tensile Strength, MPa |  |  |  |  |  |
| 20'/150 C. cure | 23.27 | 19.53 | 20.32 | 23.21 | 21.57 |
| 90'/150 C. cure | 18.56 | 17.98 | 18.9 | 20.07 | 19.39 |
| percent change | −20.2 | −7.9 | −7.0 | −13.5 | −10.1 |
| 6'/170 C. cure | 23.37 | 20.79 | 20.06 | 21.35 | 21.35 |
| 28'/170 C. cure | 14.84 | 18.39 | 17.93 | 16.8 | 17.08 |
| percent change | −36.4 | −11.5 | −10.6 | −21.3 | −20 |

TABLE III-continued

| | Control Sample 1 | Sample 2 | Control Sample 3 | Control Sample 4 | Control Sample 5 |
|---|---|---|---|---|---|
| Elongation at Break, % | | | | | |
| 20'/150 C. cure | 479 | 382 | 364 | 498 | 485 |
| 90'/150 C. cure | 491 | 357 | 379 | 474 | 443 |
| 6'/170 C. cure | 514 | 421 | 399 | 504 | 517 |
| 28'/170 C. cure | 514 | 387 | 417 | 484 | 461 |
| Shore A Hardness at 100° C. | | | | | |
| 20'/150 C. cure | 57.4 | 62.5 | 63.4 | 54.9 | 55.4 |
| 90'/150 C. cure | 49.3 | 61.7 | 60.9 | 53 | 54.6 |
| percent change | −14.1 | −1.3 | −3.9 | −3.5 | −1.4 |
| 6'/170 C. cure | 54.3 | 60.1 | 61.8 | 54.1 | 53.7 |
| 28'/170 C. cure | 43 | 58.8 | 56.1 | 48.7 | 51.4 |
| percent change | −20.8 | −2.2 | −9.2 | −10.0 | −4.4 |
| Percent Rebound at 100° C. | | | | | |
| 20'/150 C. cure | 71 | 68.6 | 70.5 | 70 | 68.4 |
| 90'/150 C. cure | 63 | 67.7 | 68.5 | 65.1 | 67 |
| percent change | −11.3 | −1.3 | −2.8 | −7.0 | −2.0 |
| 6'/170 C. cure | 69.9 | 68.8 | 69.6 | 68.6 | 67.6 |
| 28'/170 C. cure | 56.1 | 66.3 | 66.2 | 61 | 63.4 |
| percent change | −6.9 | −3.6 | −4.9 | −11.1 | −6.2 |
| Heat Rise maximum temp change (° C.) | | | | | |
| 20'/150° C. cure | 46 | 6 | 10 | 46 | 29 |
| 55'/150° C. cure | 38 | 4 | 10 | 41 | 13 |
| 90'/150° C. cure | 46 | 2 | 9 | 21 | 16 |
| 6'/170° C. cure | 49 | 7 | 13 | 60 | MF |
| 17'/170° C. cure | 49 | 4 | 13 | 27 | 13 |
| 28'/170° C. cure | 38 | 4 | 10 | 21 | 13 |

MF = machine failure, no value available
Stroke 0.25 inch (6.35 mm) Cyclic Comp 800.00 l/min
Stop Cond Time Sample Failure or 60 min Load on Sample 44.50 lbs (20.18 kg)
Preheat Tmp 93° C. Preheat Time 15.00 min The importance of heat rise is recognized in the article "Internal Temperature Distribution in a Rolling Tire," *Tire Science and Technology*, Volume 23, No. 1, pages 11–15 (1995) wherein it is stated that sometimes a significant temperature rise in a rolling tire destroys the tire in a short time. Likewise, the article "Heat Generation in Elastomer Compounds: Causes and Effects," *Rubber Chemistry and Technology*, Volume 64, No. 3, pages 481–492 (1991) discusses the degradation effects heat rise can have on ultimate physical properties. Accordingly, there is a need in the art for vulcanizates which exhibit low heat rise properties. From the results of Table III, it is clear that the Perkalink® 900/BBDTH combination of the current invention (Sample 2) gave the lowest heat rise to the final vulcanizate versus Controls 1, 3, 4 and 5. This reduction in heat rise thus contributed to the better overall retention of final vulcanizate properties observed.

What is claimed is:

1. An article consisting of a tire, hose, belt or shoe sole and containing a rubber compound comprising:
    (a) a rubber selected from the group consisting of natural rubber, a rubber derived from a diene monomer and mixtures thereof,
    (b) from about 0.1 to about 10 phr of a bismaleimide compound of the general formula:

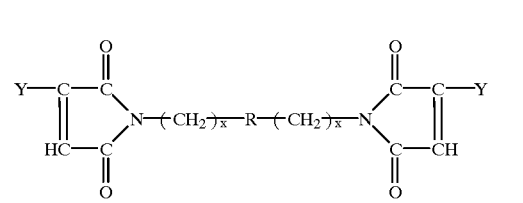

(I)

wherein R is a divalent acyclic aliphatic group having from about 2 to 16 carbon atoms, cyclic aliphatic group having from about 5 to 20 carbon atoms, aromatic group having from about 6 to 18 carbon atoms, or alkylaromatic group having from about 7 to 24 carbon atoms, wherein these divalent groups may contain a hetero atom selected from O, N and S; X is 0 or an integer of from 1 to 3 and Y is hydrogen or —$CH_3$; and
    (c) from about 0.1 phr to about 10 phr of a compound of the general formula:

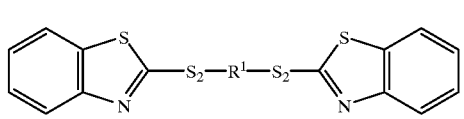

II where $R^1$ is selected from the group consisting of alkylene radicals having from 1 to 20 carbon atoms, cycloalkylene radicals having from 6 to 24 carbon atoms and arylene radicals having from 6 to 18 carbon atoms, alkarylene radicals having from 7 to 25 carbon atoms and divalent radicals of the formula:

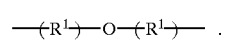

2. The article of claim 1 wherein said rubber derived from a diene monomer is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

3. The article of claim 1 wherein said bismaleimide is selected from the group consisting of N,N'-ethylenebismaleimide, N,N'-hexamethylenebismaleimide, N,N'-(m-phenylene)bismaleimide, N,N'-(p-phenylene)-bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)- bismaleimide, N,N'-(m-xylylene)bis-citraconimide and α,α-bis-(4-maleimidophenyl)-meta-diisopropylbenzene.

4. The article of claim 1 wherein said compound of formula II is selected from the group consisting of 1,1-bis(2-benzothiazolyldithio)methane; 1,2-bis(2-benzothiazolyldithio)ethane; 1,3-bis(2-benzothiazolyldithio)propane; 1,4-bis(2-benzothiazolyldithio)butane; 1,6-bis(2-benzothiazolyldithio)hexane; 1,8-bis(2-benzothiazolyldithio)octane; 1,10-bis(2-benzothiazolyldithio)decane; 1,10-bis(2-benzothiazolyldithio)octadecane; 1,18-bis(2-benzothiazolyldithio)octadecane; 2,2'-bis(2-benzothiazolyldithio)oxydiethane; 2,2'-bis(2-benzothiazolyldithio)thiodiethane; 4,4'-bis(2-benzothiazolyldithio)oxydibutane; 1,1-bis(2-benzothiazolyldithio)-1,4-cyclohexanedimethane; 1,4-bis(2-benzothiazolyldithio)benzene; α,α'-bis(2-benzothiazolyldithio)p-xylene; 1,2-bis(2-benzothiazolyldithio)cyclohexane; 1,1-bis(2-benzothiazolyldithio)cyclohexane; 1,4-bis(2-benzothiazolyldithio)cyclohexane; 1,4-bis(2-benzothiazolyldithio)naphthalene; 4,4'-bis(2-benzothiazolyldithio)biphenyl; 4,4'-bis(2-benzothiazolyldithio)oxybisbenzene and mixtures thereof.

5. The article of claim 1 wherein natural rubber is present.

6. The article of claim 1 wherein from 0.5 to 5 phr of the bismaleimide compound is present.

7. The article of claim 3 wherein said bismaleimide is N,N'-(m-phenylene)bismaleimide.

8. The article of claim 3 wherein said bismaleimide is N,N'-(m-xylene)bis-citraconimide.

9. The article of claim 1 wherein from 0.5 to 5 phr of the compound of formula II is present.

10. The article of claim 4 wherein the compound of formula II is 1,6-bis(2-benzothiazolyldithio)hexane.

11. The rubber compound of claim 1 wherein said rubber compound is in the form of a tire.

12. The rubber compound of claim 11 wherein said tire is selected from the group consisting of a passenger tire, aircraft tire, truck tire, earthmover and agricultural tire.

* * * * *